(12) United States Patent
Jones

(10) Patent No.: US 9,468,335 B2
(45) Date of Patent: Oct. 18, 2016

(54) ADJUSTABLE HEATING ASSEMBLY

(71) Applicant: Michael Jones, Las Vegas, NV (US)

(72) Inventor: Michael Jones, Las Vegas, NV (US)

( * ) Notice: Subject to any disclaimer, the term of this patent is extended or adjusted under 35 U.S.C. 154(b) by 753 days.

(21) Appl. No.: 13/719,033

(22) Filed: Dec. 18, 2012

(65) Prior Publication Data

US 2014/0165852 A1   Jun. 19, 2014

(51) Int. Cl.
*A47J 37/00* (2006.01)
*A47J 37/07* (2006.01)

(52) U.S. Cl.
CPC ......... *A47J 37/0709* (2013.01); *A47J 37/0731* (2013.01); *A47J 37/0736* (2013.01); *A47J 37/0763* (2013.01)

(58) Field of Classification Search
CPC ............. A47J 37/0704; A47J 37/0709; A47J 37/0713; A47J 37/0731; A47J 37/0763
USPC ....... 99/450, 449; 248/274.1, 298.1; 126/30, 126/26, 40, 50, 25 R, 9 R
See application file for complete search history.

(56) References Cited

U.S. PATENT DOCUMENTS

| | | | | |
|---|---|---|---|---|
| 4,347,830 A | * | 9/1982 | Runyan | 126/9 R |
| 5,033,448 A | * | 7/1991 | Sandweg | 126/25 R |
| 5,472,164 A | * | 12/1995 | Contee, Jr. | 248/214 |
| 5,582,025 A | * | 12/1996 | Dubin | F24F 1/0003 248/544 |
| 6,263,867 B1 | * | 7/2001 | Skelton | 126/37 B |
| 6,637,426 B2 | * | 10/2003 | Champlin | 126/41 R |
| 7,874,529 B2 | * | 1/2011 | Klemm et al. | 248/126 |
| 8,065,996 B1 | * | 11/2011 | Neuvelt | 126/25 R |
| 2008/0141997 A1 | * | 6/2008 | Druin | 126/39 BA |

FOREIGN PATENT DOCUMENTS

JP    2-89925    * 9/1988   ............ 126/30

* cited by examiner

*Primary Examiner* — Reginald L Alexander

(57) ABSTRACT

An adjustable heating assembly that includes a barbecue grill that extends and retracts through an opening, such as a window. The assembly secures to a window ledge and extends and retracts through the window to help control the direction and contact with heat and smoke radiating from the assembly. The assembly includes a housing that serves to contain and cook food. The housing adjusts positions by extending and retracting on a base portion. The base portion includes a track assembly. The track assembly provides a plate that slides along a pair of tracks. The base portion rests on a mounting portion. The mounting portion includes a clamp with adjustable width. The assembly extends through an opening while functioning, and then retracts back through the opening, within reach of a user, prior and subsequent to use.

16 Claims, 7 Drawing Sheets

US 9,468,335 B2

ADJUSTABLE HEATING ASSEMBLY

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to cook ware. More particularly, one or more embodiments of the invention relate to adjustable cook ware.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that a barbecue grill is a device for cooking food by applying heat directly from below. There are several varieties of such grills, with most falling into one of two categories: gas-fueled and charcoal.

Typically, a rail assembly includes two parallel rods having a plurality of perpendicular rods for support. An object may slide along a longitudinal axis of rails to extend and retract from a point.

Typically, tall buildings include enclosed rooms that do not allow smoke to escape. Windows adorn the walls of the rooms. Objects, such as plants can rest on window ledges.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A illustrates the adjustable heating assembly with the window open, and FIG. 1B illustrates the window closed, in accordance with an embodiment of the present invention;

FIG. 2A illustrates the adjustable heating assembly with an exemplary housing in a closed position, and FIG. 2B illustrates the adjustable heating assembly with an exemplary housing in an open position, in accordance with an embodiment of the present invention;

FIG. 3A illustrates the mounting portion in a closed position, and FIG. 3B illustrates the mounting portion in a closed position, in accordance with an embodiment of the present invention;

FIG. 4A illustrates the base portion in a retracted position, and FIG. 4B illustrates the base portion in an extended position, in accordance with an embodiment of the present invention;

Figure 1A:
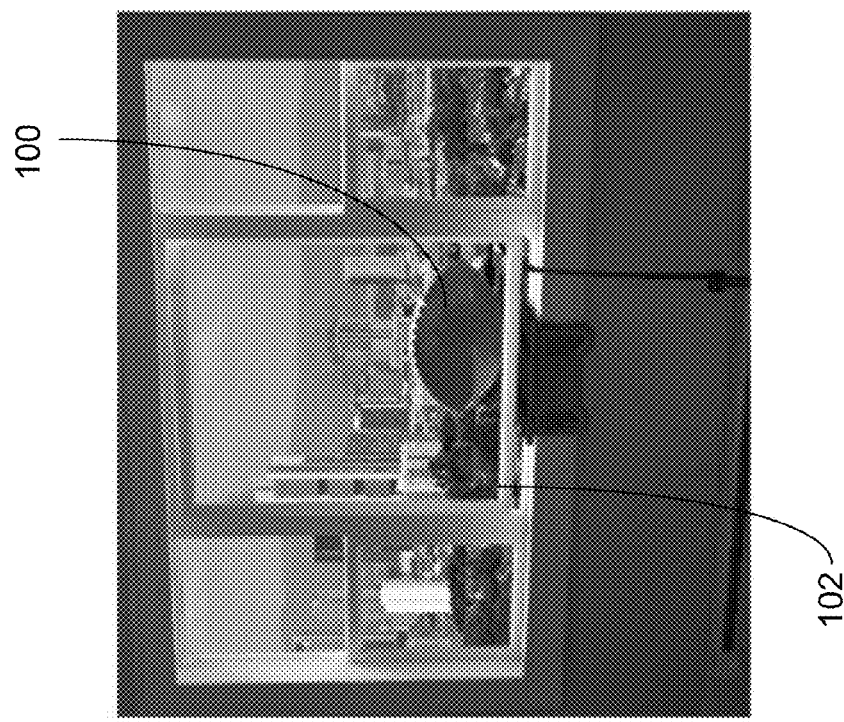
FIGS. 1A and 1B illustrate detailed perspective views of an exemplary adjustable heating assembly positioned on a window ledge, where

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

There are various types of adjustable heating assemblies that may be provided by preferred embodiments of the present invention. In one embodiment of the present invention, the adjustable heating assembly may include cookware that secures to a window ledge and extends and retracts through the window to help control the direction and contact with heat and smoke radiating from the assembly. However, in other embodiments, the assembly may adjust in a plurality of direction from any ledge or opening. Those skilled in the art, in light of the present teachings will recognize that a room inside a building may not provide a feasible area to heat and smoke food with a barbecue grill. However, extending the barbecue grill outside a window or similar opening in the room may allow for smoking and heating from the grill without the negative effects of smoke and heat. In some embodiments, the assembly may include, without limitation, a barbecue grill, a conventional oven, and a smoker. The assembly may join with a mounting surface through a mounting portion, and then extend and retract along a base portion to a desired position. In this manner, the assembly may extend outside an opening while functioning, and then retract back inside the window, within reach of a user, prior and subsequent to use.

In one embodiment of the present invention, the assembly may include a housing. The housing may be efficacious in containing food, retaining heat, and preventing smoke from escaping. The housing may contain a thermal portion for generating heat within the housing. The housing may further contain a surface portion for supporting food. The housing may include an exhaust portion for regulating the retention and release of heat and smoke from inside the housing. In one embodiment of the present invention, the housing may rest on a base portion. The base portion may include a plate that the housing rests on. The base portion may further include a pair of rails that the plate rests on. In this manner, the housing may follow the direction of the pair of rails to extend and retract to a desired position. In some embodiments, the base portion may join with a mounting portion. The mounting portion may join with a mounting surface. The mounting portion may include, without limitation, a clamp, a magnet, a screw, and an adhesive. In one embodiment, the mounting portion may include a clamp that joins with a window ledge. In some embodiments, the assembly may include a temperature control portion for regulating heat inside the housing. The assembly may further include a cord for accessing power. The cord may detach from a cord receiving portion in the housing.

Figure 1B:
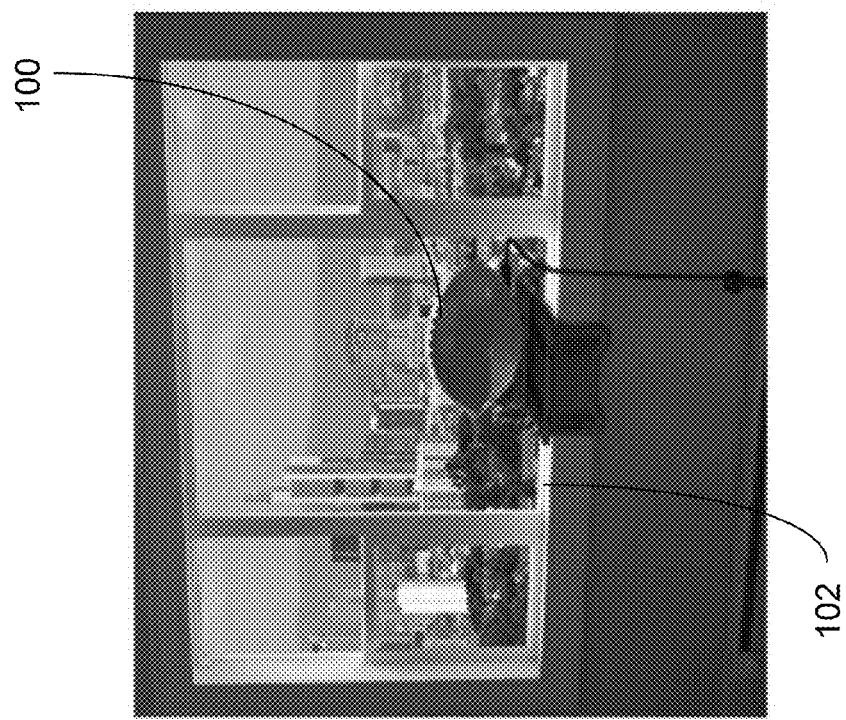

FIGS. 1A and 1B illustrate detailed perspective views of an exemplary adjustable heating assembly positioned on a window ledge, where FIG. 1A illustrates the adjustable heating assembly with the window open, and FIG. 1B illustrates the window closed, in accordance with an embodiment of the present invention. In the present embodiment, an assembly 100 may include cookware that secures to a window ledge and extends and retracts through the window to help control the direction and contact with heat and smoke radiating from the assembly. A mounting surface 102 such as a window or barrier may close to separate the assembly from the room. However in other embodiments, the assembly may adjust in a plurality of direction from any ledge or opening. For example, without limitation, the assembly may adjust vertically, at an inclined angle, and swivel up to 360 degrees. Those skilled in the art, in light of the present teachings will recognize that a room inside a building may not provide a feasible area to heat and smoke food with a barbecue grill. However, extending the barbecue grill outside a window or similar opening in the room may allow for smoking and heating from the grill without the negative effects of smoke and heat. In some embodiments, the assembly may include, without limitation, a barbecue grill, a conventional oven, and a smoker. Suitable materials for the assembly may include, without limitation, stainless steel, aluminum, iron, and composites.

In one embodiment of the present invention, the assembly may join with a mounting surface through a mounting portion, and then extend and retract along a base portion to a desired position. In this manner, the assembly may extend outside an opening while functioning, and then retract back inside the window, within reach of a user, prior and subsequent to use. In one alternative embodiment, the power and temperature regulation of the assembly may be controlled remotely through a closed window or barrier. Those skilled in the art, in light of the present teachings will recognize that a safety feature may be that an electrically powered assembly may negate the need for an open flame. Since the assembly may extend out away from the house so smoke doesn't enter a room. The assembly may then stay in the extended position, away from the room, and with the window closed while cooling down. The adjustable heating assembly may be beneficial for users who live in a tall building, or handicapped users. By way of example not limitation other suitable cook ware may include heating plate, skillet, hot plate, typical stove type surface.

Figure 2A:
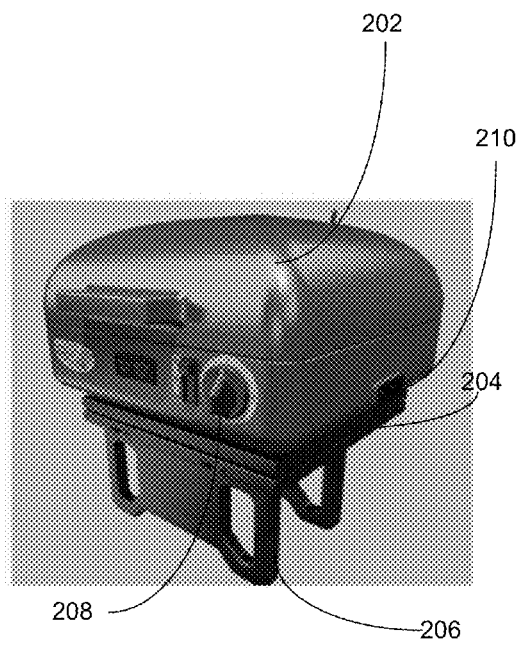
FIGS. 2A and 2B illustrate detailed perspective views of an exemplary adjustable heating assembly, where
Figure 2B:
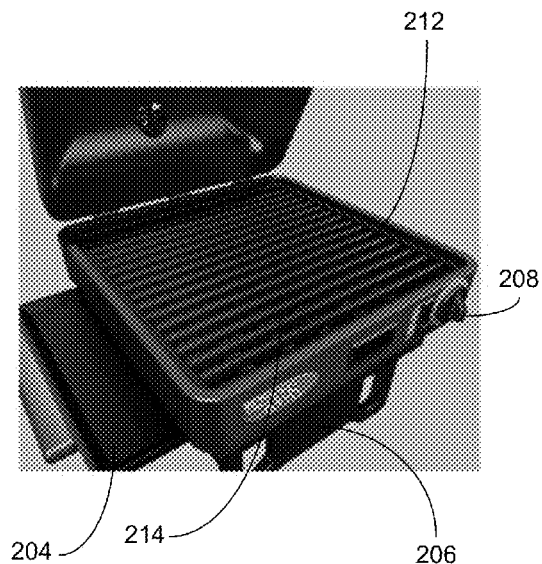

FIGS. 2A and 2B illustrate detailed perspective views of an exemplary adjustable heating assembly, where FIG. 2A illustrates the adjustable heating assembly with an exemplary housing in a closed position, and FIG. 2B illustrates the adjustable heating assembly with an exemplary housing in an open position, in accordance with an embodiment of the present invention. In the present embodiment, the assembly may include a housing 202. The housing may be efficacious in containing food, retaining heat, and preventing smoke from escaping. The housing may contain a thermal portion 214 for generating heat within the housing. The housing may further contain a surface portion 212 for supporting food. The housing may include an exhaust portion for regulating the retention and release of heat and smoke from inside the housing. In some embodiments, the housing may include a dome shape for allowing smoke to circulate over food. In some embodiments, the housing may include a temperature control portion 208 for regulating heat within. The housing may further include a cord for accessing power. The cord may detach from a cord receiving portion 210 in the housing.

In one embodiment of the present invention, the housing may rest on a base portion 204. The base portion may include a plate that the housing rests on. The base portion may further include a pair of rails that the plate rests on. In this manner, the housing may follow the direction of the pair of rails to extend and retract to a desired position. In one embodiment, the base portion may include a track system for extending and retracting the assembly. The track system may include two horizontal plates connected to each other through a track system. A bottom horizontal plate may include channels side by side upon an upper surface. A top horizontal plate may include two downward projected nodules upon a bottom surface. The nodules may join the channels on the bottom plate. In some embodiments, the plate may slide upon the track system. In one embodiment, a bottom plate may also include two channels on a bottom surface. The channels may include apertures on a sidewall of the plate. A vertical plate may join with the bottom surface of the horizontal plate. The vertical plate may be immobile and include a supporting brace positioned on a back wall for additional support. In some embodiments, a separate vertical plate with two nodules may position within the channels. The nodules may protrude into the apertures of the channels. In this manner, the separate plate may adjust back and forth within the channels. In yet another embodiment, the assembly may adjust through other mechanisms, including, without limitation, a spring, a magnet, a pulley, a piston, a ball bearing roller system and any type of slide system.

In one embodiment of the present invention, the base portion may join with a mounting portion 206. The mounting portion may join with a mounting surface. The mounting portion may include, without limitation, a clamp, a magnet, a screw, and an adhesive. In one embodiment, the mounting portion may include a clamp that joins with a mounting surface, including, without limitation, a window ledge, window sills, truck beds, and residential block walls.

Figure 3A:
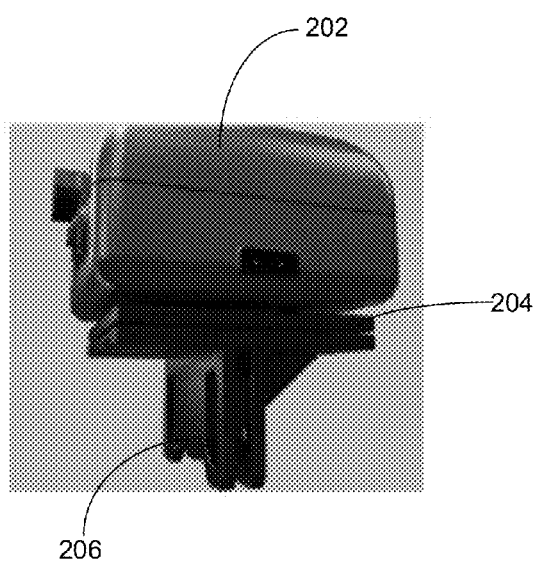
FIGS. 3A and 3B illustrate detailed perspective views of an exemplary mounting portion, where
Figure 3B:
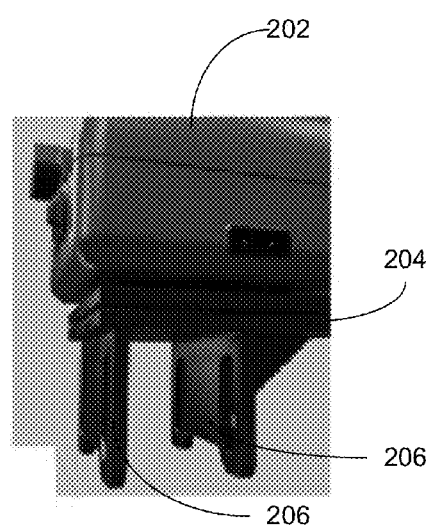

FIGS. 3A and 3B illustrate detailed perspective views of an exemplary mounting portion, where FIG. 3A illustrates the mounting portion in a closed position, and FIG. 3B illustrates the mounting portion in a closed position, in accordance with an embodiment of the present invention. In the present embodiment, the mounting portion may include an adjustable width for securing to variously sized and dimensioned mounting surfaces. The mounting portion may include, without limitation, a clamp, a magnet, a screw, and an adhesive.

Figure 4A:
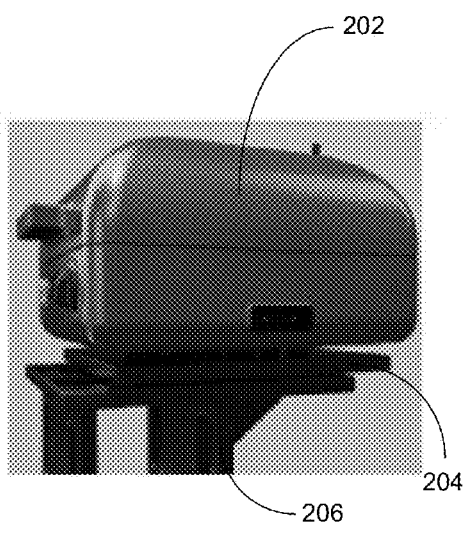
FIGS. 4A and 4B illustrate detailed perspective views of an exemplary base portion, where
Figure 4B:
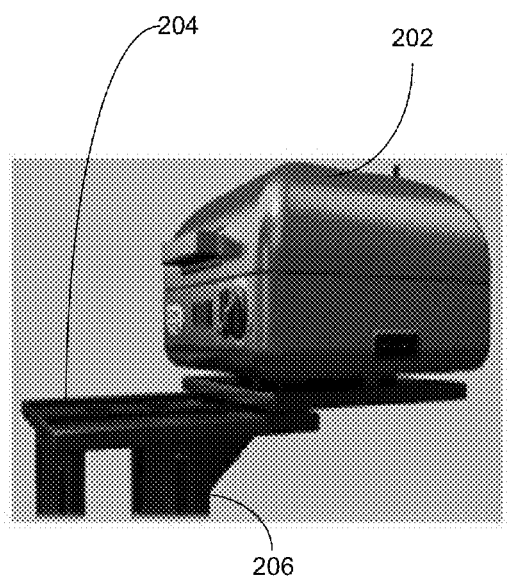

FIGS. 4A and 4B illustrate detailed perspective views of an exemplary base portion, where FIG. 4A illustrates the base portion in a retracted position, and FIG. 4B illustrates the base portion in an extended position, in accordance with an embodiment of the present invention. In the present embodiment, the base portion may extend so that the housing moves to an extended position away from the user. The base portion may also retract so that the housing moves to a retracted position towards from the user. The base portion may include a plate that the housing rests on. The base portion may further include a pair of rails that the plate rests on. In this manner, the housing may follow the direction of the pair of rails to extend and retract to a desired position.

Figure 5:
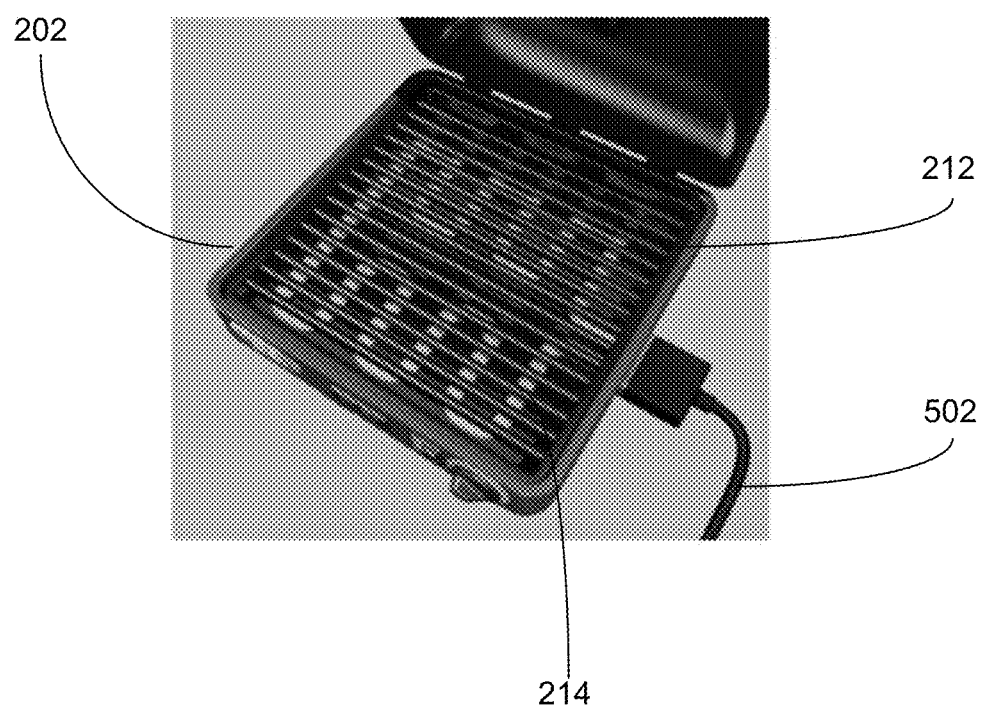
FIG. 5 illustrates a detailed perspective view of an exemplary surface portion, in accordance with an embodiment of the present invention.

FIG. 5 illustrates a detailed perspective view of an exemplary surface portion, in accordance with an embodiment of the present invention. In the present embodiment, The surface portion may include parallel bars for supporting food, and allowing food residue to fall through. In some embodiments, the surface portion may include roller brackets, upon which a durable tray may be supported. In yet another embodiment, an electric grill may be mounted on the surface portion. A cord 502 may supply electrical current to power the electric grill.

Figure 6:
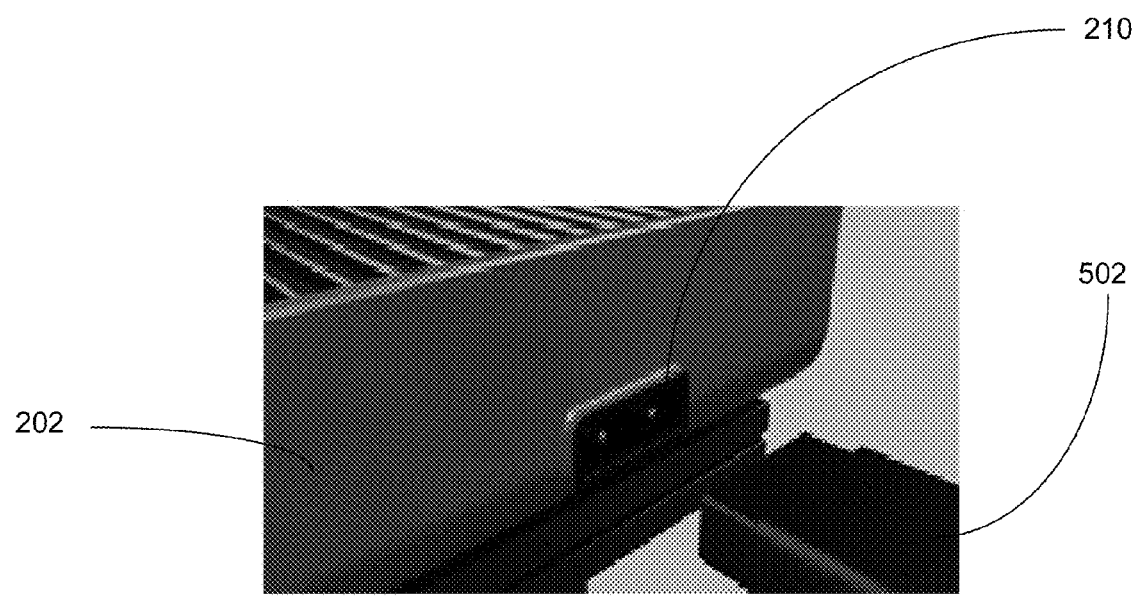
FIG. 6 illustrates a detailed perspective view of an exemplary cord joining with an exemplary cord receiving portion, in accordance with an embodiment of the present invention.

FIG. 6 illustrates a detailed perspective view of an exemplary cord joining with an exemplary cord receiving portion, in accordance with an embodiment of the present invention. In the present embodiment, the assembly may receive electrical power to reduce smoke. The cord may join with the cord receiving portion of the housing to provide electrical current. However, in another embodiment, the assembly may generate heat through various means, including, without limitation, propane, charcoals, and solar energy.

Figure 7:
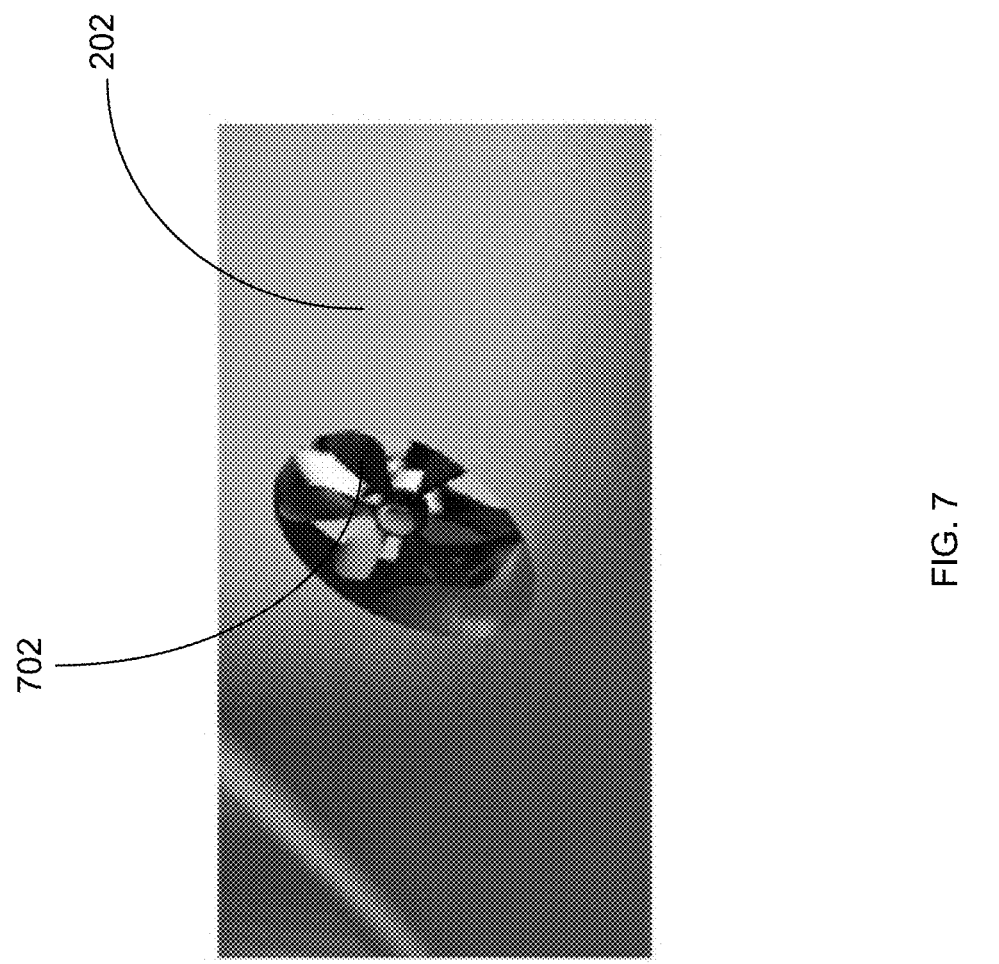
FIG. 7 illustrates a detailed perspective view of an exemplary exhaust portion positioned on an exemplary housing, in accordance with an embodiment of the present invention.

FIG. 7 illustrates a detailed perspective view of an exemplary exhaust portion positioned on an exemplary housing, in accordance with an embodiment of the present invention. In the present embodiment, an exhaust portion 702 may help in regulating the heat content inside the housing. In some embodiments, the exhaust portion may include an aperture for the smoke and heat to escape the housing. The size of the aperture may be adjusted to provide additional control of the smoke and heat inside the housing.

In one alternative embodiment, the housing may be replaced with a plant or a bird house. In this manner, a user may manipulate the plant from the retracted position, and then extend the plant outside a window to receive sunshine. In yet another alternative embodiment, the mounting portion may mount from outside a building, and then swivel through an open window for allowing access to the user.

All the features or embodiment components disclosed in this specification, including any accompanying abstract and drawings, unless expressly stated otherwise, may be replaced by alternative features or components serving the same, equivalent or similar purpose as known by those skilled in the art to achieve the same, equivalent, suitable, or similar results by such alternative feature(s) or component(s) providing a similar function by virtue of their having known suitable properties for the intended purpose. Thus, unless expressly stated otherwise, each feature disclosed is one example only of a generic series of equivalent, or suitable, or similar features known or knowable to those skilled in the art without requiring undue experimentation.

Having fully described at least one embodiment of the present invention, other equivalent or alternative methods of implementing extendable and retractable grills that adjust to pass through an opening according to the present invention will be apparent to those skilled in the art. Various aspects of the invention have been described above by way of illustration, and the specific embodiments disclosed are not intended to limit the invention to the particular forms disclosed. The particular implementation of the extendable and retractable grills that adjust to pass through an opening may vary depending upon the particular context or application. By way of example, and not limitation, the extendable and retractable grills that adjust to pass through an opening described in the foregoing were principally directed to barbecue grills that extend from a building window implementations; however, similar techniques may instead be applied to cooking stoves, fryers, and pressure cookers that extend and retract, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An electric cookwear assembly comprising:
   a housing, said housing comprises an exhaust portion;
   a base portion, said base portion being configured to support said housing, said base portion being operable to move said housing portion in a plurality of positions;
   a mounting portion, said mounting portion being configured to join with said base portion, said mounting portion further being configured to join with a mounting surface, wherein said mounting surface comprises a window ledge or window sills, and wherein said mounting portion configured to position on top of the mounting surface and removably fasten to the window ledge or window sills from lateral directions; and
   said housing comprises a barbecue grill.
2. The assembly of claim 1, in which said housing comprises a surface portion.
3. The assembly of claim 2, in which said housing comprises a thermal portion.
4. The assembly of claim 3, in which said housing comprises a temperature control portion.
5. The assembly of claim 4, in which said housing comprises a timer portion.
6. The assembly of claim 5, in which said housing comprises a cord.
7. The assembly of claim 6, in which said housing comprises a cord receiving portion.
8. The assembly of claim 7, in which said housing comprises a canopy having a shape of a dome.
9. The assembly of claim 8, in which said base portion comprises a plate.
10. The assembly of claim 9, in which said base portion comprises a pair of tracks rails.
11. The assembly of claim 10, wherein said base portion extends to an extended position.
12. The assembly of claim 11, wherein said base portion retracts to a retracted position.
13. The assembly of claim 12, in which said mounting portion comprises a clamp.
14. The assembly of claim 13, wherein said mounting portion is operable to clamp on to said mounting surface.
15. The assembly of claim 14, in which said assembly comprises stainless steel material.
16. An electric cookwear assembly consisting of:
   a housing, said housing comprising a barbecue grill, said housing further comprising an exhaust portion, said housing further comprising a surface portion, said housing further comprising a thermal portion, said housing further comprising a temperature control portion, said housing further comprising a timer portion, said housing further comprising a cord, said housing further comprising a cord receiving portion;
   a base portion, said base portion being configured to support said housing, said base portion being operable to move said housing portion in a plurality of positions, said base portion comprising a plate, said base portion further comprising a pair of tracks; and
   a mounting portion, said mounting portion being configured to join with said base portion, said mounting portion further being configured to join with a mounting surface, said mounting portion comprising a clamp;
   wherein said mounting surface comprises a window ledge or window sills, and
   wherein said mounting portion configured to position on top of the mounting surface and removably fasten to the window ledge or window sills from lateral directions.

* * * * *